United States Patent
Tanaka et al.

(10) Patent No.: US 6,340,519 B1
(45) Date of Patent: Jan. 22, 2002

(54) CHIPPING-RESISTANT PAINT

(75) Inventors: Koji Tanaka; Kenichi Kitano; Toshiaki Masuda, all of Osaka (JP)

(73) Assignee: Matsumoto Yushi Seiyaku Co., Ltd., Yao (JP)

(*) Notice: Subject to any disclaimer, the term of this patent is extended or adjusted under 35 U.S.C. 154(b) by 0 days.

(21) Appl. No.: 09/202,640

(22) PCT Filed: Jun. 17, 1997

(86) PCT No.: PCT/JP97/02083

§ 371 Date: Dec. 12, 1998

§ 102(e) Date: Dec. 12, 1998

(87) PCT Pub. No.: WO97/48772

PCT Pub. Date: Dec. 24, 1997

(30) Foreign Application Priority Data

Jun. 19, 1996 (JP) ............................................. 8-157998

(51) Int. Cl.⁷ .............................. B32B 5/16; B32B 7/02; B32B 3/26; B05D 3/02; C08J 9/32
(52) U.S. Cl. ................. 428/327; 428/220; 428/314.4; 427/373; 427/388.1; 427/409; 521/76; 523/218
(58) Field of Search .............................. 428/220, 314.4, 428/327; 427/373, 388.1, 409, 421; 521/76; 513/218

(56) References Cited

U.S. PATENT DOCUMENTS

| | | | | |
|---|---|---|---|---|
| 4,456,507 A | * | 6/1984 | Kivel et al. | 204/181 T |
| 5,520,961 A | | 5/1996 | Lysell et al. | 427/385.5 |

FOREIGN PATENT DOCUMENTS

| | | |
|---|---|---|
| EP | 0 026 388 | 9/1980 |
| JP | 42-26524 | 12/1942 |
| JP | 56-57856 | 5/1981 |
| JP | 58-71968 | 4/1983 |
| JP | 61-40335 | 2/1986 |
| JP | 62-286534 | 12/1987 |
| JP | 525419 | 2/1993 |
| JP | 5214569 | 8/1993 |
| JP | 6-157976 | 6/1994 |
| JP | 7-166093 | 6/1995 |
| JP | 7-166094 | 6/1995 |
| JP | 7-166096 | 6/1995 |
| JP | 7-166097 | 6/1995 |

* cited by examiner

*Primary Examiner*—Blaine Copenheaver
*Assistant Examiner*—Hai Vo
(74) *Attorney, Agent, or Firm*—Foley & Lardner

(57) ABSTRACT

A water-based chipping-resistant paint which comprises 30 to 65 weight percent of solid matter and 0.1 to 10 weight percent of low-temperature volatility solvent as a water-based dispersion substance and wherein the solid matter contains 15 to 75 weight percent of film-formable resin, 0.2 to 25 weight percent of thermoexpandable microspheres, and 20 to 80 weight percent of chipping-resistant material, facilitates vaporization of water at the time of film formation owing to mixing of the low-temperature volatility solvent, can prevent cracking and blistering of a film due to water remaining in the film and vaporization of water remaining after the film formation, and readily form a thick film owing to an expansion effect of the thermoexpandable microspheres at the stage of baking after coating, and therefore is suitable for a chipping resistant underbody coating for automobiles.

9 Claims, No Drawings

CHIPPING-RESISTANT PAINT

FIELD OF THE INVENTION

The present invention relates to water-based chipping-resistant paint which improves chipping resistance, anti-corrosiveness, and soundproof performance of metal board; and its application to automobiles.

BACKGROUND OF THE INVENTION

The underfloor, wheel house, and side sill of automobile outside are usually painted with underbody coating materials for improving their chipping resistance, anti-corrosiveness, and soundproof performance. The major conventional underbody coating material applied for the purpose is vinyl-chloride-based plastisol containing vinyl chloride resin as a major component, a plasticizer, and a filler. Such plastisol has been painted and baked to be changed into coating film after painted on metal substrate. Such vinyl-chloride-based plastisol has been required to have a viscosity of 40,000 cPs or more in order to be painted into sufficient thickness, 200 to 1000 $\mu$m, which is necessary to achieve desirable performance as underbody coating film.

Contrary to the above high-viscosity paint, low-viscosity vinyl-chloride-based paints containing thermoexpandable microcapsules were proposed in Japanese Patent Provisional Publication No. 25419 of 1993 and U.S. Pat. No. 5,520,961.

When an automobile is scrapped to be recycled into raw materials for steel making or casting, vinyl-chloride-based plastisol painted on metal parts is burnt to generate hydrogen chloride. The hydrogen chloride causes environmental hazard, and in addition, organic solvent contained in vinyl-chloride-based paints in considerable amount pollutes air in work place and threats occupational safety in painting operation.

Recently, a new chipping-resistant paint for automobiles substitutable for vinyl-chloride-based paints has been demanded for preventing the above hazard. And water-based paint, in which solid matters are dispersed in water, is paid much attention. A desirable chipping-resistant paint must form sufficiently thick film like as the above vinyl-chloride-based paint, in other words, it must have thixotropy. For imparting such property required for chipping-resistant paint to water-based paint, a water-dispersible inorganic filler blended in paint is proposed in Japanese Patent Provisional Publication No. 214269 of 1993, and hollow microspheres blended for reducing high specific gravity of chipping-resistant paint is proposed in European Patent Application No. 0026388A1 and Japanese Patent Provisional Publication No. 166093 of 1995.

The water in the inside of the thick film of water-based chipping resistant paint cannot be evaporated as fast as the water on the film surface. Because the energy required for water evaporation is so great that the thermal energy applied to the film in drying process is insufficient to dry up both the surface and inside of thick paint film simultaneously. And the water in thick film of water-based paint boils when heated at 100° C. or higher, or remains in the inside of the paint film after the surface of the paint film is dried into coating film through drying and baking process. Such behavior of water causes crack, split, or swell of coating film.

For preventing such troubles, several methods are proposed: blending a heat sensitizing agent proposed in Japanese Patent Provisional Publication No. 166094 of 1995; controlling the average particle size of film forming polymer dispersed in aqueous emulsion in 0.3 $\mu$m or more and blending hollow microspheres proposed in Japanese Patent Provisional Publication No. 166096 of 1995; and blending inorganic fibers proposed in Japanese Patent Provisional Publication No. 166097 of 1995. However, those preventive measures may bear other troubles, such as unstable dispersion of paint ingredients, or big bubbles, 200 to 500 $\mu$m in diameter, generated in paint film.

The present invention provides water-based resin paint which has superior chipping resistance; forms underbody coating film without crack, split, and swell; and is safe and free from environmental pollution.

DESCRIPTION OF THE INVENTION

The chipping-resistant paint of the present invention contains 30 to 65 weight percent, preferably 30 to 60 weight percent, of solid matter, and 0.1 to 10 weight percent of low-volatility solvent, both of which are dispersed in water. The said solid matter comprises 15 to 75 weight percent of film-formable resin, 0.2 to 25 weight percent of thermoexpandable microspheres, and 20 to 80 weight percent of chipping-resistant material.

And the present invention includes chipping-resistant film of 0.2 to 5 $\mu$m thickness formed by painting and heating the said chipping-resistant paint, and containing separate hollows inside.

The present invention also includes the method for forming chipping-resistant film, wherein the said chipping-resistant paint is spread on a metal substrate and heated to the temperature higher than the expansion temperature of the thermoexpandable microspheres contained for expanding the microspheres so as to increase the thickness of the paint film.

The advantage of the present invention is the forming of thick paint film from thin paint film by expanding the contained thermoexpandable microspheres with heat applied in drying and baking process. The method does not require spreading thick paint film on metal surface and thus can avoid the troubles involved in painting thick film.

Further the paint of the present invention can release water easily when painted on a surface owing to the function of low-temperature volatility solvent blended as a film-forming agent, and thus can prevent water from remaining in paint film, and the crack or swell of paint film due to the evaporation of water from the inside of baked paint film.

Another advantage of the paint of the present invention is its improved chipping resistance owing to the inorganic chipping resistant agent blended.

THE BEST MODE OF THE EMBODIMENT

The present invention is further explained in detail.

The water-based chipping-resistant paint of the present invention contains film-formable resin being dispersed in water into emulsion and the like. Almost all of the aqueous emulsion of resins conventionally used as water-based paint can be applied as the above-mentioned emulsion of the film-formable resin. Those are polyvinyl acetate emulsion, vinyl acetate copolymer emulsion, acrylic ester copolymer emulsion, polyethylene emulsion, paraffin wax emulsion, epoxy resin emulsion, urethane resin emulsion, butadiene-styrene copolymer latex, and butadiene-acrylonitril copolymer latex.

The most preferable emulsions are vinyl acetate copolymer emulsion, acrylic ester copolymer emulsion, and urethane resin emulsion, because of their superior film-forming performance, compatibility to pigments, film strength, and film hardness.

The ratio of the film-formable resin in the water-based chipping-resistant paint is 15 to 75 weight percent, preferably 20 to 60 weight percent. The ratio lower than 15 weight percent is insufficient to attain desirable strength as underbody coating paint, because low resin content results in insufficient adhesion of resin to microspheres expanded in paint film or to fillers, and decreases the strength of the vehicle of chipping-resistant paint. The ratio more then 75 weight percent is not preferable because of the increased cost of the paint beyond an acceptable range. In addition, excessive resin content simultaneously decreases the ratio of thermoexpandable microspheres below the level necessary to achieve sufficient cushioning effect, and thus such paint fails to attain sufficient chipping resistance and low specific gravity of coating film.

The water-based chipping-resistant paint of the present invention contains thermoexpandable microspheres, and low-volatility solvent which functions as a film-forming agent.

The chipping-resistant paint of the present invention, in which thermoexpandable microspheres is contained, can attain sufficient performance being painted into thin film, and water can evaporate from thin film in a short time. In addition, the low-volatility solvent facilitates the evaporation of water from paint film in drying and baking process. Those performances prevent the crack, peel, and swell of coating film. The thin film of the paint of the present invention changes into thick film through drying and baking operation as the thermoexpandable microspheres are expanded with heat. And the thick film containing a lot of hollows of the expanded microspheres has improved elasticity, which contributes to better chipping-resistance.

The thermoexpandable microspheres applicable to the paint of the present invention are thermoexpandable microcapsules manufactured by encapsulating a blowing agent in thermoplastic resin, or thermally foamable beads manufactured by immersing a low-boiling-point hydrocarbon into thermoplastic resin balloons. The applicable expansion ratio of those microspheres is 20 to 150 times, preferably 40 to 100 times of their original volume, and their particle size after expansion is 20 to 200 µm, preferably 40 to 150 µm. The hollows of those expanded microspheres must be separated from each other for attaining satisfiable film strength. The preferable starting temperature of the expansion of those microspheres is 100 to 150° C., and the preferable temperature of their maximum expansion is 140 to 190° C. Those thermoexpandable microcapsules can be manufactured in the methods of prior art proposed in Japanese Patent Publication No. 26524 of 1967 and Japanese Patent Provisional Publication No. 286534 of 1987. Those thermoexpandable beads can also be manufactured in the methods of prior art proposed in Japanese Patent Provisional Publication No. 40335 of 1986. The preferable thermoexpandable microspheres are those produced by encapsulating low-boiling-point hydrocarbon in microspheres, such as "MATSUMOTO MICROSPHERE F" produced by Matsumoto Yushi-Seiyaku Co., Ltd. The preferable microspheres of the product line are "MATSUMOTO MICROSPHERE F-82D", which expands to 40 to 150 µm in diameter, 40 to 70 times of its original size, at 140 to 190° C.; and "MATSUMOTO MICROSPHERE F-100SSD", which expands to 10 to 100 µm in diameter, 20 to 70 times of its original size, at 120 to 180° C.

The ratio of the said thermoexpandable microspheres is 0.2 to 25 weight percent, preferably 0.5 to 15 weight percent, of the solid matter in the said chipping-resistant paint. The ratio less than 0.2 weight percent is not enough to expand the film of the chipping-resistant paint, and the film cannot be imparted with satisfiable chipping resistance. The ratio more than 25 weight percent produces too much hollows in film leading to fragile film structure having low performance of chipping-resistance. The paint containing such thermoexpandable microspheres can achieve underbody coating film having sufficient thickness similar to that of the paints containing no thermoexpandable microspheres, with much less quantity. Thus the weight of underbody coating film and the quantity of paint can be decreased.

The chipping-resistant paint of the present invention contains a low-volatility solvent as film-forming agent. The solvent functions to lower the minimum temperature of paint forming film, and to plasticize the paint film in baking process so as to facilitate the evaporation of water in the film and the better formation of film.

The preferable low-volatility solvents for the paint of the present invention are those having compatibility to water and boiling point of 90 to 250° C. They are alcohols, glycols, such as ethylene or butylene glycol, derivatives of glycols, and glycidyl ethers. The ratio of the solvent in the paint is 0.1 to 10 weight percent, preferably 0.2 to 5 weight percent. The solvents applicable for the purpose are butyl cellosolve, butyl cellosolve acetate, carbitol, butyl carbitol, butyl carbitol, butyl carbitol acetate, carbitol acetate, hexylene glycol, and texanol. The most preferable among those solvents are butyl cellosolve, butyl cellosolve acetate, and hexylene glycol.

More than 10 weight percent of the solvent makes hard and fragile film in baking and thus reduces chipping-resistance. In addition, high solvent ratio often results in crack, peel, and swell of film due to remaining solvent in film in baking process. Less than 0.1 weight percent of the solvent cannot make water evaporate from coating film in baking process, and results in crack, peel, and swell of coating film after baking.

The solvent having high boiling point, above 250° C., evaporates too slowly in baking process and causes swell in coating film. Further, such solvent sometimes remain in coating film after baking leading to stain or peel of coating film. On the other hand, the solvent having low boiling point, below 90° C., may be troublesome in handling, and sometimes requires cooling device in the manufacturing process of the paint.

The water-based chipping-resistant paint of the present invention contains chipping-resistant material for imparting chipping resistance to the resultant coating film. Inorganic cushioning materials are preferable for the purpose.

The inorganic cushioning materials for the present invention are the small particles blended in the paint to absorb the impact from colliding pebbles. The inorganic cushioning materials applied to the present invention have variable particle form, disperse evenly in water-dispersible resin, and control the hardness of coated film at proper level. The preferable particle size of the inorganic cushioning materials is 1 to 200 µm, more preferably 5 to 50 µm. The particle size lower than 1 µm cannot attain sufficient chipping resistance, while the particle size greater than 200 µm makes non-uniform film surface.

The inorganic cushioning materials applicable to the present invention are talc, clays including kaolin, calcium hydroxide, silica, mica, agalmatolite, and glass beads. Among those, talc, clays and calcium hydroxide are the most preferable.

The water-based chipping-resistant paint of the present invention contains at least one of the above chipping-resistant materials in 20 to 80 weight percent, preferably 30 to 70 weight percent of the solid matter in the paint. Low ratio of chipping resistant materials below 20 weight percent cannot attain cushioning effect, and high ratio of chipping-resistant materials above 80 weight percent makes nonelastic film with poor chipping resistance.

Recently, hollow microspheres, i.e., inorganic balloons such as glass balloons, or resin balloons such as plastic balloons are applied as well as the above inorganic cushioning materials. Those balloons can be applied to the paint of the present invention alone or together with inorganic cushioning materials. The volume of such hollow microspheres is much greater comparing to their weight. And thus their optimum ratio in the paint of the present invention is 20 weight percent or less according to their volume.

Plasticizers can also be blended to the paint of the present invention in addition to the above water-dispersible resin. The preferable plasticizers are water-insoluble phthalic acid esters, such as dibutyl phthalate, dioctyl phthalate, and diisononyl phthalate are preferable plasticizers. Small quantity of such plasticizers can be blended to the paint in its preparation process gradually by small quantity, while greater quantity has to be added to the paint in emulsion state.

The preferable ratio of the plasticizer to the film-formable resin in the paint of the present invention is 50 weight percent or less. Excessive plasticizer in the paint results in sticky or stained film surface, or too soft film having insufficient strength and decreased chipping-resistance.

A viscosity improver can be added to the water-based chipping-resistant paint of the present invention for the purpose of controlling its viscosity to a desirable level. The preferable viscosity improvers are water-soluble polymers, such as acrylic emulsion with alkaline viscosity improver, high-polymer polysaccharides, methyl cellulose, hydroxypropyl cellulose, hydroxyethyl cellulose, carboxymethyl cellulose, and polyvinyl alcohol. The preferable ratio of the viscosity improver in the paint composition is 0.01 to 10 weight percent according to a desirable viscosity.

The preferable viscosity of the paint of the present invention is 10,000 to 100,000 cPs, more preferably 20,000 to 70,000 cPs, variable according to the required initial thickness of paint film, i.e., the thickness of paint film before baking.

The paint of the present invention can be prepared with a emulsifying and dispersing device, for example, "HOMO-MIXER" produced by Tokushu Kika Kougyou Co., Ltd., as follows. At first, thermoexpandable microspheres are added to a water-dispersible film-formable resin and dispersed well in the resin. Then water is added to the level at which the solid matters in the resultant chipping-resistant paint is 65 weight percent, preferably 60 weight percent or less. The chipping-resistant material, low-volatility solvent, and dispersing agent are added following to water, and the mixture is agitated well to be made into paint preparation. Then a viscosity improver is added to control the viscosity of the preparation to a desirable level. The prepares paint is then sieved with a 60-mesh standard sieve (of which opening distance is approx. 250 $\mu$m), and deaerated with a vacuum agitator at approx. 20 mmHg for 15 minutes to be made into the water-based chipping-resistant paint of the present invention.

The water-based chipping-resistant paint of the present invention can contain reinforcing materials in addition to the film-formable resin. Those reinforcing materials are synthetic fibers, such as vinylon fiber, polyamide fiber, cellulosic fiber; glass fiber; powders of thermoplastic resins, such as polyamide resin, and polyolefin resin; and powders of natural or synthetic rubbers. The preferable average particle size of those materials is 0.1 to 150 $\mu$m, and the preferable melding point of the thermoplastic resins or synthetic rubber is 70 to 140° C. The preferable ratio of the reinforcing material in the paint preparation is 0.5 to 10 weight percent.

The water-based chipping-resistant paint of the present invention can contain one or more anti-corrosive pigments being selected among metal salts of chromated, phosphate, molybdate, tungstate, and tannate. The metals contained in the above salts are those belonging to the I, II, III, and IV groups of the periodic table, such as sodium molybdate, sodium tungstate, or tricalcium phosphate. Red lead and cyanamide lead cannot be applied because of their toxicity to environment, though they have sufficient performance for the purpose.

Any of the pigments usually applied can be blended in the paint of the present invention, such as carbon black, titanium oxide, chromium oxide, or red iron oxide.

The water-based chipping-resistant paint of the present invention may contain other components if necessary, such as water-soluble polyamines for improving adhesiveness, or ethylene glycol and the like as a humectant to present the skinning of the paint during long-time storage.

The chipping-resistant coating film of the present invention, which is applied as underbody coating material, can be formed on metal substrate with the said water-based chipping-resistant paint in the following method.

After painting the water-based chipping-resistant paint of the present invention, the paint film is treated in the first-step heating to be dried and gelled at the temperature below the expansion point of the thermoexpandable microspheres, and then heated in the second-step heating to the expansion temperature of the thermoexpandable microspheres contained in order to form thick film by expanding the microspheres and simultaneously to gel the film completely. The heating temperature and time vary depending on the thickness of paint film before heating, and on the expansion behavior of thermoexpandable microspheres contained. The preferable heating temperature and time are 40 to 120° C. and 1 to 30 minutes for the first step, and 120 to 180° C. and 10 to 60 minutes for the second step.

In the first-step heating, the paint film is only dried and partially gelled at the temperature lower than the expansion point of the thermoexpandable microspheres contained. In the second-step heating, the thermoexpandable microspheres are expanded and the paint film is completely gelled.

The first-step and second-step heating mentioned above can be operated continuously or simultaneously in one process to dry and gel the paint film, and to expand the microspheres to thicken the paint film. The preferable heating temperature and time for one-step heating are 120 to 180° C. and 10 to 60 minutes, which vary depending on the thickness of paint film and expansion behavior of thermoexpandable microspheres contained. A paint film containing hollows of 200 $\mu$m in diameter or less and having elongation of 50% or more can be easily obtained through such heating operation.

The chipping-resistant paint of the present invention is sprayed with an Airless Pump in 50 to 2,000 $\mu$m thickness on a steel substrate which has been coated with cationic paint in electrode-positioning. The chipping-resistant paint can also be painted directly on a steel substrate in 100 to 1,000 $\mu$m thickness with a squeegee. Such paint film is then dried and baked to be formed into chipping-resistant film of 200 to 5,000 $\mu$m thickness, preferable 200 to 2,000 $\mu$m thickness.

The present invention is further illustrated by the following Examples, but the invention is not limited to the details therein.

EXAMPLES 1 to 12 and Comparative Examples 1 to 4

Preparation of Paint

The paints in the Examples from 1 to 12 and in the Comparative examples 1 to 4 were prepared according to the formulae shown in Tables 1 and 2. Their viscosity was controlled at approx. 40,000 cPs with a viscosity improver. The figures in the Tables represent parts by weight. The emulsions represented by A, B, and C in the Tables are VONOCAT EC-821 (solid matter 50%) manufactured by Dainippon Ink Chemical Industries Co., Ltd., ACRYSET 110E (solid matter 54%) manufactured by Nihon Catalyst Chemical Industries Co., Ltd., and NEOREZ R967 (solid matter 40%) manufactured by Zeneca Co., Ltd., respectively. The microcapsules represented by D and E are MATSUMOTO MICROSPHERE F-82D and MATSUMOTO MICROSPHERE F-100SSD, respectively.

Painting

Each of the above paint preparations was sprayed on a steel substrate on which cationic paint had already been applied as base coat by electro-positioning. The paints blended with thermoexpandable microspheres were sprayed into 400 μm thickness, and those without thermoexpandable microspheres were sprayed into 800 μm thickness.

Baking

The steel substrates applied with the acryl-styrene-based paints and urethane-resin-based paints were baked in an oven at 140° C. for 30 minutes. The steel substrates applied with the acrylic-acid-ester-based paints were heated at 120° C. for 4 minutes, and then backed at 140° C. for 30 minutes.

Evaluation of Paint Film

The film of the paint samples was evaluated in the following tests. The result is shown in Tables 1 and 2.

Film Thickness

The thickness of paint film after baking was measured with a micrometer and expressed in millimeter.

Swell and Crack on Film Surface

The swell and crack on film surface after baking were visually inspected, and ranked into three grades, ○ none, Δ a little, and x a lot.

Hollows in Baked Film

Each of the baked film was cut into a 100 mm and 200 mm rectangle. The rectangle was cut into four pieces across the longer side. The hollows of the sections of those pieces were inspected and ranked as follows: ○, all of the hollows have 200 μm or less diameter; Δ, some of the hollows have 200 μm or more diameter though all of them are smaller than 500 μm; and x, some of the hollows have 500 μm or more diameter.

Elongation of Film

The elongation (%) of the film was tested according to JIS K6301 (revised on Mar. 1, 1982).

Form of film sample:

Dumbbell-shaped test specimen, No. 2 in JIS K6301

Thickness of film sample: 3 mm

Distance between marks: 20 mm

Distance between clamps: 60 mm

Pulling speed: 50 mm/min

The film samples were prepared as follows. A sheet of 60-μm thick Teflon releasing fabric (glass-fiber fabric coated with Teflon resin, durable to 400° C.) was spread and fixed on the surface of a steel substrate applied with cationic paint by electro-positioning in 0.8 mm thickness. A paint sample was sprayed on the fabric with an Airless Pump in the thickness which would be expanded to 3-mm thickness after baking at 140° C. for 30 minutes. After baking, the film was released from the fabric surface.

Chipping Resistance

A paint sample was sprayed in 400-μm thick film with an Airless Pump on the surface of a steel substrate which had been applied with cationic paint by electro-positioning in 0.8 mm thickness, and the film was baked at 140° C. for 30 minutes. Then the steel substrate was mounted at 45° angle with the baked film on top. A 2-m long vinyl chloride pipe, of which inner diameter was 20 mm, was vertically placed on the baked film, touching one opening on the film surface. Nuts (JIS M-4) were thrown down from the other opening of the pipe one by one to simulate the chipping on car bodies by pebbles. The chipping resistance of the film sample was represented by the total weight of the nuts thrown on the film until the film was broken and the metal substrate surface appeared.

TABLE 1

| | Examples | | | | | | | | |
|---|---|---|---|---|---|---|---|---|---|
| | 1 | 2 | 3 | 4 | 5 | 6 | 7 | 8 | 9 |
| Components (parts by weight) | | | | | | | | | |
| Acryl-styrene emulsion A (50%) | 50 | 50 | 50 | 0 | 0 | 0 | 0 | 0 | 0 |
| Acrylic acid ester emln. B (54%) | 0 | 0 | 0 | 50 | 50 | 50 | 0 | 0 | 0 |
| Urethane resin emulsion C (40%) | 0 | 0 | 0 | 0 | 0 | 0 | 50 | 50 | 50 |
| Carbon black | 5 | 5 | 5 | 5 | 5 | 5 | 5 | 5 | 5 |
| Calcium carboxide | 37 | 35 | 31 | 37 | 35 | 31 | 37 | 35 | 31 |
| Silica gel | 15 | 15 | 15 | 15 | 15 | 15 | 15 | 15 | 15 |
| Polyamide resin powder | 5 | 5 | 5 | 5 | 5 | 5 | 5 | 5 | 5 |
| Sodium hexamethalate (10%) | 0.5 | 0.5 | 0.5 | 0.2 | 0.2 | 0.2 | 0.2 | 0.2 | 0.2 |
| Alkali-soluble acrylic emulsion (28%) | 5 | 5 | 5 | 5 | 5 | 5 | 0 | 0 | 0 |
| Water-soluble polysaccharide | 0 | 0 | 0 | 0 | 0 | 0 | 1 | 1 | 1 |
| Butylcellosolve acetate | 0.5 | 0.5 | 0.5 | 0.5 | 0.5 | 0.5 | 0.5 | 0.5 | 0.5 |
| Microcapsule D | 2 | 4 | 8 | 2 | 4 | 8 | 2 | 4 | 8 |
| Microcapsule E | 0 | 0 | 0 | 0 | 0 | 0 | 0 | 0 | 0 |
| Water | 32 | 32 | 32 | 35 | 35 | 35 | 25 | 25 | 25 |

TABLE 1-continued

|  | Examples | | | | | | | | |
| --- | --- | --- | --- | --- | --- | --- | --- | --- | --- |
|  | 1 | 2 | 3 | 4 | 5 | 6 | 7 | 8 | 9 |
| Total | 152 | 152 | 152 | 154.7 | 154.7 | 154.7 | 140.7 | 140.7 | 140.7 |
| Baked film property | | | | | | | | | |
| Density | 1.15 | 0.95 | 0.81 | 1.09 | 0.96 | 0.82 | 1.05 | 0.92 | 0.81 |
| Thickness (mm) | 0.6 | 0.8 | 0.8 | 0.6 | 0.8 | 0.8 | 0.7 | 0.8 | 0.8 |
| Swell | ○ | ○ | ○ | ○ | ○ | ○ | ○ | ○ | ○ |
| Crack | ○ | ○ | ○ | ○ | ○ | ○ | ○ | ○ | ○ |
| Cavities | ○ | ○ | Δ | ○ | ○ | ○ | Δ | Δ | Δ |
| Elongation (%) | 98 | 82 | 62 | 100 | 88 | 82 | 66 | 62 | 58 |
| Chipping resistance (kg) | 78 | 74 | 78 | 92 | 96 | 90 | 102 | 105 | 100 |

TABLE 2

|  | Examples | | | Comparative Examples | | | |
| --- | --- | --- | --- | --- | --- | --- | --- |
| Examples and Comparative Examples | 10 | 11 | 12 | 1 | 2 | 3 | 4 |
| Components (parts by weight) | | | | | | | |
| Acryl-sytrene emulsion A (50%) | 50 | 0 | 0 | 50 | 0 | 0 | 50 |
| Acrylic acid ester emln. B (54%) | 0 | 50 | 0 | 0 | 50 | 0 | 0 |
| Urethane resin emulsion C (40%) | 0 | 0 | 50 | 0 | 0 | 50 | 0 |
| Carbon black | 5 | 5 | 5 | 5 | 5 | 5 | 5 |
| Calcium carboxide | 31 | 31 | 31 | 39 | 39 | 43 | 35 |
| Silica gel | 15 | 15 | 15 | 15 | 15 | 15 | 15 |
| Polyamide resin powder | 5 | 5 | 5 | 5 | 5 | 5 | 5 |
| Sodium hexamethalate (10%) | 0.2 | 0.2 | 0.2 | 0.5 | 0.2 | 0.2 | 0.5 |
| Alkali-soluble acrylic emulsion (28%) | 5 | 5 | 0 | 5 | 5 | 0 | 5 |
| Water-soluble polysaccharide | 0 | 0 | 1 | 0 | 0 | 1 | 0 |
| Butylcellosolve acetate | 0.5 | 0.5 | 0.5 | 0.5 | 0.5 | 0.5 | 0 |
| Microcapsule D | 0 | 0 | 0 | 0 | 0 | 0 | 4 |
| Microcapsule E | 8 | 8 | 8 | 0 | 0 | 0 | 0 |
| Water | 32 | 35 | 26 | 32 | 35 | 25 | 32 |
| Total | 151.7 | 154.7 | 141.7 | 152 | 154.7 | 144.7 | 151.5 |
| Baked film Property | | | | | | | |
| Density | 0.98 | 0.95 | 0.98 | 1.31 | 1.34 | 1.33 | 0.95 |
| Thickness (mm) | 0.8 | 0.8 | 0.8 | 0.8 | 0.8 | 0.8 | 0.8 |
| Swell | ○ | ○ | ○ | × | × | × | ○ |
| Crack | ○ | ○ | ○ | Δ | × | Δ | ○ |
| Cavities | ○ | ○ | ○ | × | × | × | × |
| Elongation (%) | 88 | 95 | 102 | 48 | 42 | 52 | 48 |
| Chipping resistance (kg) | 82 | 92 | 103 | 35 | 48 | 62 | 66 |

Field of Application

The water-based chipping-resistant paint of the present invention can be easily painted and baked into underbody coating film. And the resultant film is light and has superior chipping resistance suitable to be applied as the chipping-resistant film for automobiles.

What is claimed is:

1. A water-based chipping-resistant paint comprising, 30 to 65 weight percent of solid matter and 0.1 to 10 weight percent of low-temperature volatility solvent being dispersed in water, wherein the solid matter consists of 15 to 75 weight percent of film-formable resin, 0.2 to 25 weight percent of thermoexpandable microspheres which expand from about 20 to about 150 times their original volume, and 20 to 80 weight percent of chipping-resistant material.

2. The water-based chipping-resistant paint according to claim 1, wherein said composition contains 30 to 60 weight percent of said solid matter.

3. The water-based chipping-resistant paint according to claim 1, wherein the water-compatible low-temperature volatility solvent has a boiling point of about 90 to 250° C.

4. The water-based chipping-resistant paint according to claim 1, wherein, said thermoexpandable microspheres expand to a diameter of 20 to 200 μm.

5. A chipping-resistant coating film having a thickness of 0.2 to 5 mm and having hollows in its structure, said coating being formed by painting and baking a water-based chipping-resistant paint containing 30 to 65 weight percent of solid matter and 0.1 to 10 weight percent of low-temperature volatility solvent, which are dispersed in water, and wherein said solid matter consists of 15 to 75 weight percent of film-formable resin, 0.2 to 25 weight percent of thermoexpandable microspheres which expand from about 20 to about 150 times their original volume, and 20 to 80 weight percent of chipping-resistant material.

6. The chipping-resistant coating film according to claim 5, wherein said coating is formed by painting water-based chipping-resistant paint containing 30 to 60 weight percent of said solid matter.

7. The chipping-resistant coating film according to claim 6, wherein said coating has an elongation ratio of 50% or more.

8. A method for forming chipping-resistant coating film having greater thickness than its painted state, in which water-based chipping-resistant paint containing a water-based dispersion of 30 to 65 weight percent of solid matter, said solid matter comprising 15 to 75 weight percent of film-formable resin, 0.2 to 25 weight percent of thermoexpandable microspheres which expand from about 20 to about 150 times their original volume, and 20 to 80 weight percent of chipping resistant material; and 0.1 to 10 weight percent of low-volatility solvent is painted on a metal substrate, and then baked at the temperature higher than the expansion temperature of the thermoexpandable microspheres to thicken the painted film.

9. The method for forming chipping-resistant coating film according to claim 8, wherein the chipping-resistant paint contains 30 to 60 weight percent of said solid matter.

\* \* \* \* \*